United States Patent [19]

Folmar

[11] Patent Number: 4,967,776
[45] Date of Patent: Nov. 6, 1990

[54] OIL FILTER CLEANING SYSTEM

[76] Inventor: Gordon Folmar, Rt. 2, Box 38C, Pelham, Ga. 31779

[21] Appl. No.: 448,970

[22] Filed: Dec. 12, 1989

[51] Int. Cl.$^5$ ............................ B08B 3/02; B08B 9/08
[52] U.S. Cl. ...................................... 134/57 R; 33/501;
134/62; 134/89; 134/95; 134/99; 134/103;
134/115 R; 134/169 R; 134/171
[58] Field of Search ................... 134/57 R, 62, 89, 95,
134/99, 103, 115 R, 166 R, 169 R, 171, 201;
33/501

[56] References Cited

U.S. PATENT DOCUMENTS

| | | | |
|---|---|---|---|
| 1,446,579 | 2/1923 | Paulson | 134/104.2 |
| 2,263,367 | 11/1941 | Peterson | 134/169 R X |
| 2,526,286 | 10/1950 | Schwarzkopf et al. | 134/169 R X |
| 2,602,483 | 7/1952 | Graham | 100/94 |
| 2,668,550 | 2/1954 | Borge | 134/62 |
| 2,687,136 | 8/1954 | Moore | 134/93 X |
| 2,905,079 | 9/1959 | Brock | 100/94 |
| 4,058,412 | 11/1977 | Knapp et al. | 134/62 X |
| 4,585,019 | 4/1986 | Jacobson | 134/99 X |

FOREIGN PATENT DOCUMENTS 2340388  8/1974  Fed. Rep. of Germany ...... 134/171

Primary Examiner—Philip R. Coe
Attorney, Agent, or Firm—Richard C. Litman

[57] ABSTRACT

An oil filter cleaning system includes a piercing apparatus for cutting openings in a used oil filter to allow drainage of excess dirty oil therefrom. A rinsing and cleansing mechanism is provided atop a chamber containing liquid solvent and includes one or more nozzles upon which the original bottom opening of drained oil filters are mounted following which, a pump is actuated to inject solvent into the filters and which is expelled from the pierced openings. Thereafter, pressurized air is injected into the filters from the same nozzles to remove all residual solvent and oil therefrom. Separate piercing and rinsing and cleansing stations may be provided for treating one filter at a time or alternatively, these stations may be combined into one station operable to simultaneously treat a plurality of filters. In the latter instance, it is proposed to include a sorting device to facilitate the accumulation of several filters having the same diameter in order to accommodate a gang piercing mechanism.

16 Claims, 3 Drawing Sheets

OIL FILTER CLEANING SYSTEM

BACKGROUND OF THE INVENTION

This invention relates generally to a cleaning apparatus and more particularly, to an improved system for initially draining the dirty oil from used, discarded automotive-type oil filters and subsequently, removing residual oil from the filter interior by the application of a solvent and air blast.

The disposal of contaminating articles and/or substances is becoming an ever increasing problem. For some time, special procedures have been practiced for the disposal of obviously highly toxic substances. Recently, many jurisdictions have banned heretofore allowable articles from disposal in landfills, wherein such articles contain contaminants, such as used oil as found in discarded oil filters. A need exists for a procedure to quickly and easily remove the oil from used filters so they may be safely disposed of or the metal therein reclaimed.

The very nature of the construction and operation of oil filters as used in automotive vehicles, presents a problem in their disposal. The filter comprises a cylindrical body or can provided with an end opening and containing a filter medium. When installed and the associated engine is started, oil is pumped into and fills the can interior. The filter is constructed to prevent draining or siphoning of this contained oil when the engine is no longer running and regardless of the inclination of the can. This precludes cavitation or formation of an air pocket within the filter can and which would interfere with the proper operation of the engine oil flow system. But, this property of the filter is what presents a difficulty in its disposal, since the can will still retain a pint or more of oil when it is removed from an engine. It is by the present system that improved means are provided to initially, pierce a filter body to permit draining of the bulk of the oil entrapped within the filter and then, achieve a thorough cleansing of the filter interior by the application of a biodegradable solvent followed by an air blast treatment to remove substantially all traces of oil and solvent.

DESCRIPTION OF THE RELATED ART

It is known to cleanse containers by inverting same atop an upwardly directed nozzle from which a cleaning solution is jetted into the container interior. Examples of such apparatus will be found in U.S. Pat. Nos. 1,446,579, 2,687,136 and 4,585,019 issued to Paulson, Moore and Jacobson, respectively. Additionally, the broad concept of piercing or cutting a can body is generally known as evidenced in U.S. Pat. Nos. 2,602,483 and 2,905,079 issued to Graham and Brock, respectively. No combination of the above prior art suggests the unique combination as offered by the present invention.

SUMMARY OF THE INVENTION

This invention involves an improved method and apparatus for treating used, discarded oil filters of the automotive-type and wherein the used filters, containing a substantial measure of oil, are initially punctured to allow the entrapped oil to drain therefrom into a collection receptacle. The existing end opening of the filter can is then placed about an upstanding treatment nozzle following which, a liquid solublizing agent is injected into the interior of the filter body. This agent, which is preferably biodegradable, entrains the residual oil within the can interior and on its contained filter medium and is discharged from the can through the plurality of openings formed during the piercing operation. The cleansing solution is located in a receptacle beneath the treatment nozzle and the solution as injected into the filter can, is collected from adjacent the bottom of the receptacle by means of a submersible pump.

The flushing of the filter unit with the cleansing solution is carried out until the discharged solution ceases to indicate an oil content. Thence, a pressurized air supply is activated to admit a blast of compressed air into the filter can interior so as to physically blow out remnants of oil-containing solvent within its interior. This air blast is delivered through the same treatment nozzle as used to inject the solublizing agent, with the air and oil residue likewise being ejected from the pierced openings in the filter body.

As the specific gravity of the oil component discharging into the receptacle is lower than that of the solublizing agent, the collected oil will stratify at the top of the body of the solution, thus enabling use of the apparatus for an extended period of time before cleaning the apparatus or replenishing the solution. Even this latter maintenance can be deferred, by permitting the ever-increasing volume of fluid in the receptacle to automatically exit through overflow means. One or more apertures or a weir may be provided adjacent the top surface of the fluid to draw off the oil content accumulating on the solution surface.

The invention may be practiced by operating upon a single oil filter unit at a time or alternatively, multiple filters may be handled simultaneously. In the first instance, an extremely economical apparatus may be provided and wherein the piercing of the filter cans is accomplished by a manually actuated lever device atop an oil collection vessel. Thereafter, the pierced can is inserted with its original end opening about a single treatment nozzle disposed above the solution agent receptacle. In the case of an operator desiring to treat several thousand used oil filters per day, an alternate embodiment is proposed wherein a single treatment station atop the solution agent receptacle includes a gang mechanism having multiple nozzles. This station is operable to simultaneously pierce opposed sides of a plurality of filter cans and then, without further manipulation of the filter cans, is actuated to inject solublizing agent and then air, into all of the cans mounted therein.

BRIEF DESCRIPTION OF THE DRAWINGS

Similar reference characters designate corresponding parts throughout the several figures of the drawings.

DESCRIPTION OF THE PREFERRED EMBODIMENTS

Figure 1:
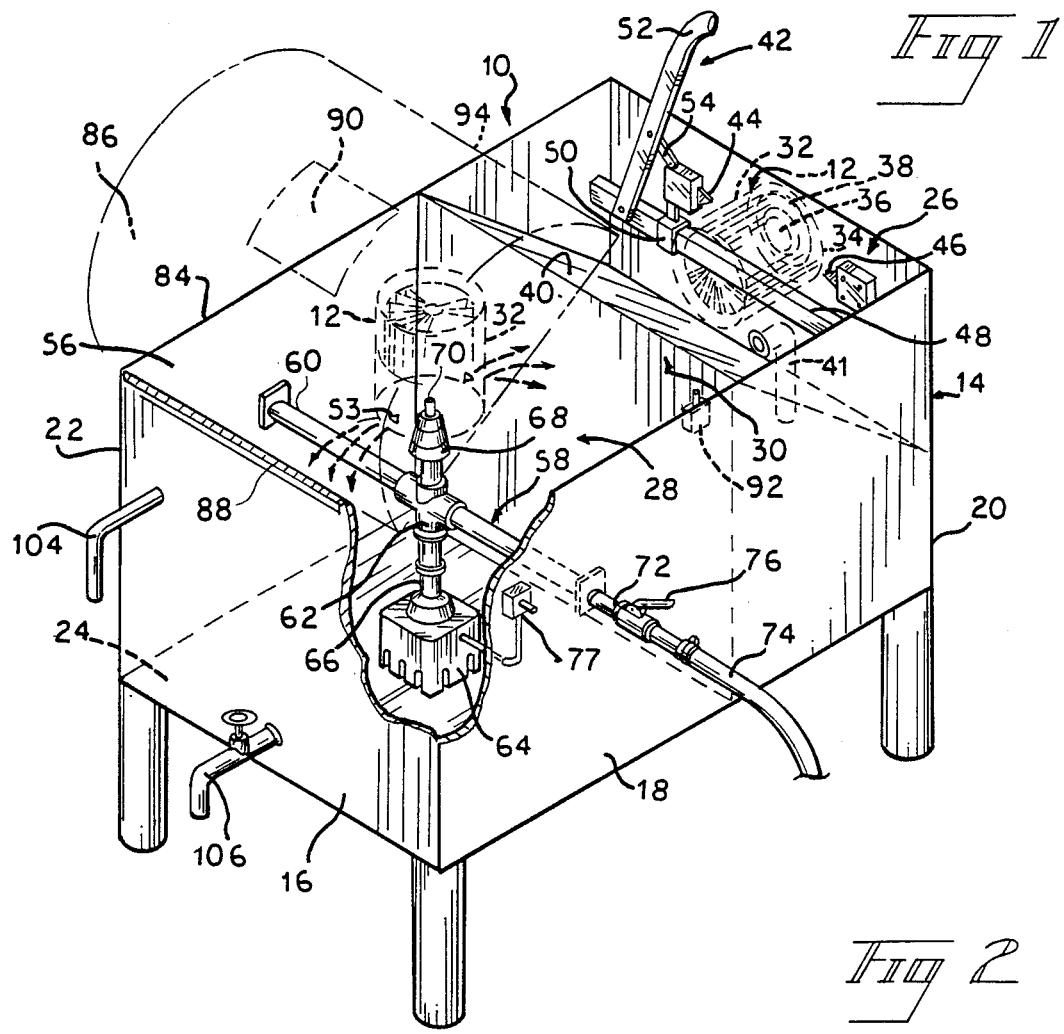
FIG. 1 is a top perspective view of an oil filter cleaning system according to the present invention.
Figure 2:
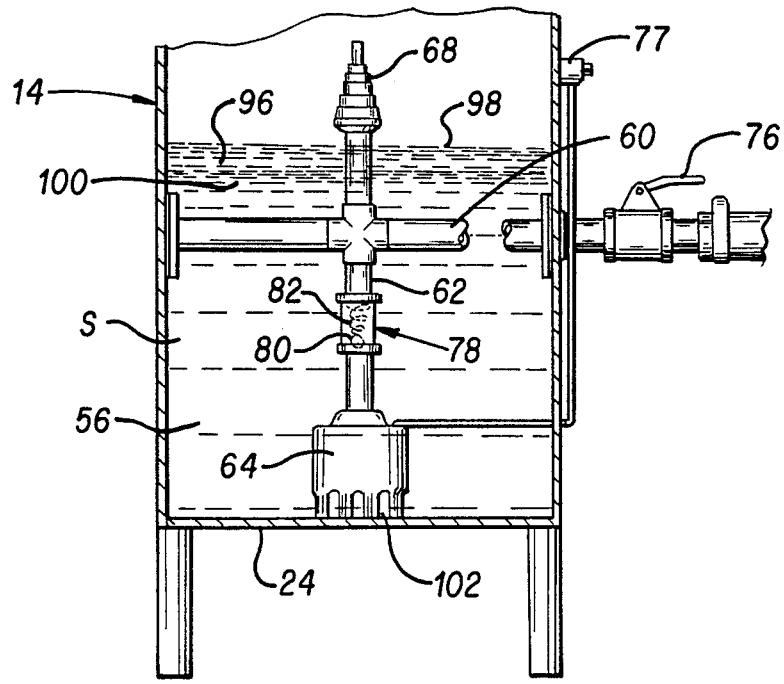
FIG. 2 is an end sectional view of the apparatus of FIG. 1.

Referring now to the drawings, FIGS. 1 and 2 will be seen to illustrate an embodiment of the present system comprising a cleaning apparatus 10 which is adapted to treat used, discarded oil filters 12, one at a time. The apparatus includes a housing 14 as formed by a plurality of lateral walls 16, 18, 20, 22 spanned by a bottom wall 24. The interior of the housing 14 is divided into a piercing and draining station 26 adjacent a rinsing and cleaning station 28, by means of a partition wall 30.

Before describing in detail the construction of the above two stations 26, 28, the nature of the filters 12 being processed should be understood. The typical oil filter comprises a cylindrical body or can 32 having a bottom or end wall 34 provided with a threaded opening 36 surrounded by a resilient gasket 38. As is well known in the field of oil filters for internal combustion engines, the filter medium 40 therein is constructed in a manner to preclude draining or siphoning of oil from the filter can when the engine is not running. Thus, when a new filter is installed and the engine started, the associated oil pump initially completely fills all voids within the filter can interior and thereafter, for each measure of oil pumped into the can, an equal measure of filtered oil is displaced therefrom and circulated into the engine oil galleys. It is in view of this filter construction that when a used filter is removed and discarded, it will retain a noticeable measure of dirty oil therein, usually amounting to a pint or more. It is by the present invention that not only is the filter body cleansed of all measurable oil so it may be safely discarded or otherwise utilized, such as processing for its metal value but, the oil as reclaimed is readily collected for its acknowledged value to the oil re-refining or reprocessing industry.

To initially prepare a discarded, used oil filter 12, it is processed in the piercing and draining station 26. This station will be seen from FIG. 1 to include an inclined lower wall 40 which abuts the housing lateral wall 20 adjacent a drain line 41 so that oil as collected within this station may be directed to a suitable receiver, either an adjacent portable container or a remote mass storage apparatus. To allow for the rapid drainage of oil from within a used filter 12, it is necessary to form a plurality of openings in the peripheral wall of the filter can 32 adjacent the can end wall 34. In this manner, the antisiphoning feature of the filter will be destroyed and the majority of oil therewithin will drain from such openings.

To accomplish the above piercing operation, a can piercing means comprising the assembly 42, is mounted within the station 26 and manipulated so as to rectilinearly displace a first cutter element 44 relative a second, stationary cutter element 46. An elongated support or guide element 48 will be seen to be mounted adjacent the housing lateral wall 20, with the displaceable first cutter element 44 connected thereto by means of the sliding foot member 50. Piercing of a can 32 is achieved by abutting a can end wall 34 against the housing lateral wall 20, between the two spaced apart cutter elements 44, 46. The operator then actuates a lever 52 pivoted to the support member 50 so as to linearly shift the cutter element 44 by means of the connecting link 54. This manipulation captures the filter body 32 between the two cutter elements 44, 46 whereupon further actuation of the lever 52 causes the cutter elements to pierce the filter body at diametrical points adjacent the can end wall 34 to create a pair of drain openings 53—53. As soon as the lever 52 is retracted, the can may be removed from between the now spaced apart cutter elements and deposited upon the inclined wall 40 of this station. In short order, the bulk of the oil within the filter will drain from the pierced openings 53—53 and thence exit via the drain line 41.

Following treatment in the piercing and draining station 26, the filter 12 will be free of excess oil but quite obviously a measurable amount of residual oil will yet remain adhered to the can interior and its filter medium. By some standards the filter still will be regarded as contaminated with oil to such a degree that it is unacceptable for depositing in landfills or for direct transfer to other uses such as scrap melting. Accordingly, it is proposed to treat the can interior and its contained filter medium with a pressurized injection of a suitable fluid solvent and to then remove substantially all of this solvent from the filter can by the application of pressurized air.

The above operation is accomplished by transferring the drained filter 12 from the station 26 to the adjacent rinsing and cleansing station 28. Disposed within the chamber 56 formed by the walls 14, 16, 18 and 30 defining this latter station, is an injection or rinsing and cleansing assembly 58 including a first conduit 60 mounted between the walls 14 and 18 and a second conduit 62 having its interior communicating with the interior of the first conduit 60, at a point intermediate the housing walls 14, 18. A submersible pump 64, preferably electrically driven, is situated upon the bottom wall 24 of the station 28, with its output line 66 communicating with the second conduit 62. A quantity of solublizing agent S, comprising any suitable solvent for oil, preferably biodegradable, is placed within the station chamber 56 to a level adjacent the first conduit 60.

Mounted atop the first conduit 60 is a treatment nozzle 68 having a truncated conical periphery terminating in a topmost exit port 70. The bore of this nozzle in turn communicates with the interior of the first conduit 60 and thus the interior of the second conduit 62. Connected to the free, open end 72 of the first conduit 60 is an air line 74, leading to a suitable source of compressed air and which is activated by control means, such as intermediate valve 76.

In the operation of the rinsing and cleansing station 28, a drained filter 12 from the piercing and draining station 26 is inserted, with its bottom opening 36 firmly disposed about the conical nozzle 68. In this respect, it will be appreciated that the diameter of the nozzle 68 is selected to insure that variously dimensioned can openings 36 will seat upon the nozzle periphery, between its top and bottom limits. The pump 64 is then actuated, such as by means of a switch 77 or other control means mounted on the housing, to force the solvent S as collected at the very bottom of the chamber 56 to be directed upwardly through the second conduit 62, nozzle 68 and into the interior of the filter body 32. The pump is allowed to operate for several seconds or as long as required to thoroughly saturate and rinse the can interior and filter medium. The duration of this rinse cycle may be visually determined through observation of the clarity of the solvent issuing from the can drain openings 53—53 and being directed into the solvent bath S. Thereafter, the operator manipulates the air control valve 76 to admit compressed air from the air supply line 74 into the first conduit 60, nozzle 68 and interior of the filter can 32. The blast of compressed air strips the residual solvent from within the can interior and its filter medium and directs this residue outwardly through the same pierced can openings 53—53 and into the solvent bath S.

To permit use of the nozzle 68 and first conduit 60 for transmission of both the solublizing agent S and compressed air, a one-way check valve 78 is disposed in communication with the second conduit 62, intermediate the first conduit 60 and fluid pump 64. This valve 78 is of any suitable well known construction such as shown in FIG. 2 wherein, a ball valve 80 is normally urged by the spring 82, to a closed position sealing off the output line 66 to the pump 64. With this arrangement, when the air control valve 76 is operated, compressed air is precluded from passing to the fluid pump 64 but when this pump is actuated, the solvent S being urged upwardly through the line 66 automatically opens the valve member 80 against the force of the spring 82.

Alternative means may be provided to insure containment of the waste oil and solvent directed from the filter openings 53, 53. The housing walls may be constructed of sufficient height so that the treatment nozzle 68 and thus the bottom wall 34 of filters mounted thereon, will be disposed well below the level of the housing top edge 84. In this manner, all fluid being forced from treated filters will be captured within the confines of the housing chamber 56. As an option, a cover 86 may be mounted atop the chamber and attached for easy manipulation, as shown in FIG. 1. This cover 86 is preferably joined by means of a hinge 88 and may include a transparent window 90 therein. Additionally, optional switch means 92 may be provided to allow actuation of the fluid pump switch 77 when contacted by the cover lower edge 94. If employed, the switch means 92, when engaged upon closure of the cover 86, would complete the circuit allowing operation of the pump switch 77.

As the used oil is received in the chamber 56 along with the solvent S being cycled through the nozzle 68, the oil component 96 will accumulate upon the top of the solvent S, due to the lower specific gravity of the oil. After the treatment of numerous filters 12, the depth of the waste oil floating atop the solvent will increase, as will also the height of the top surface 98 of this oil body. The body of fluid within the chamber 56 will require attention either before the bottom level 100 of the oil component reaches the pump intakes 102 or, the oil top surface 98 reaches the nozzle 68. Automatic means may be provided to siphon off the oil 96, such as the discharge line 104 which obviously will be disposed at a level selected to limit the rise of the fluid within the chamber 56. When the depth of the oil body 96 reaches such an extent that its bottom level 100 is in close proximity to the pump 64, the entire fluid contents of the chamber 56 may be readily evacuated by means of a bottom drain line 106.

Figure 3:
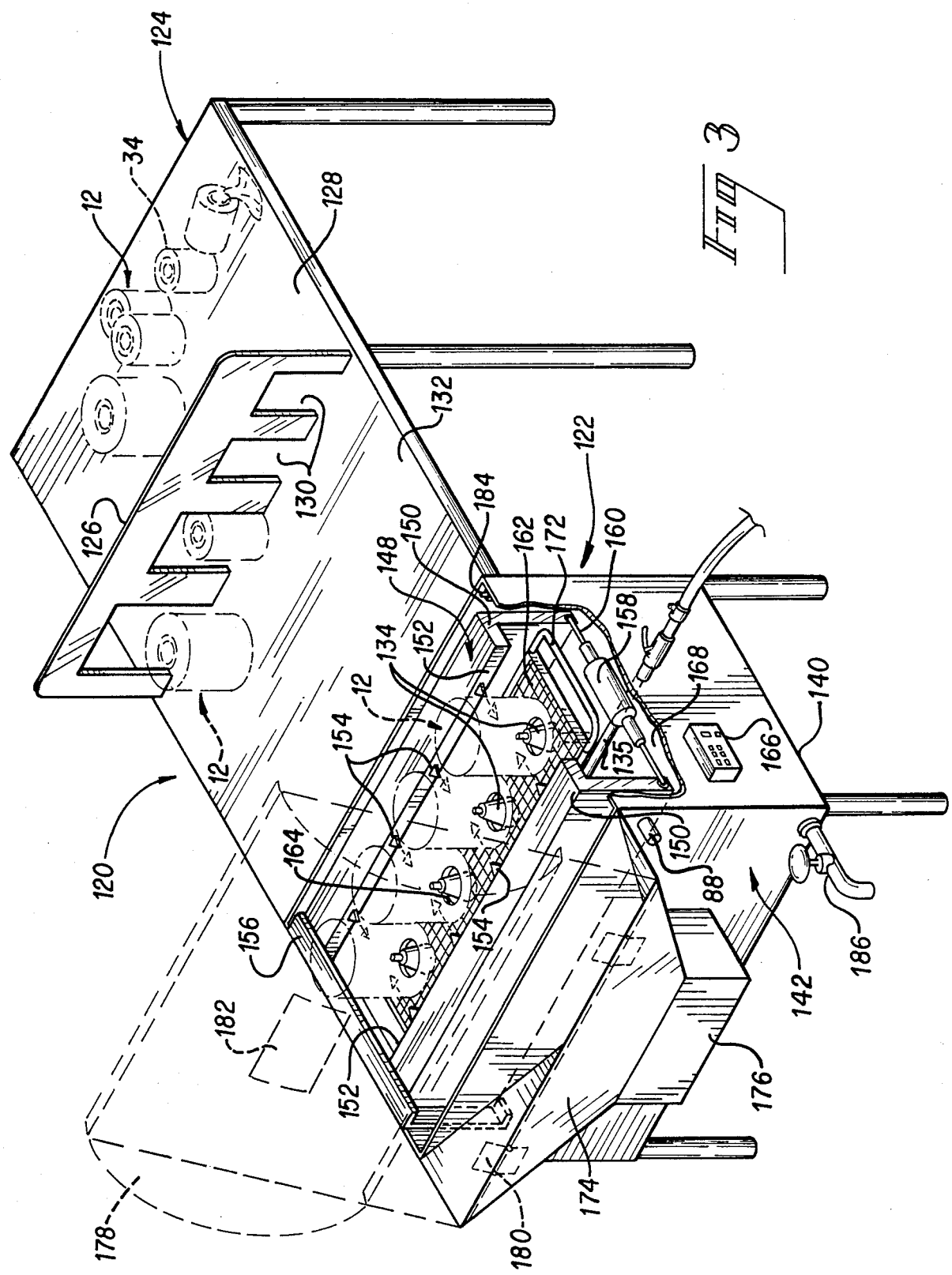
FIG. 3 is a top perspective view of a further embodiment of the invention.
Figure 4:
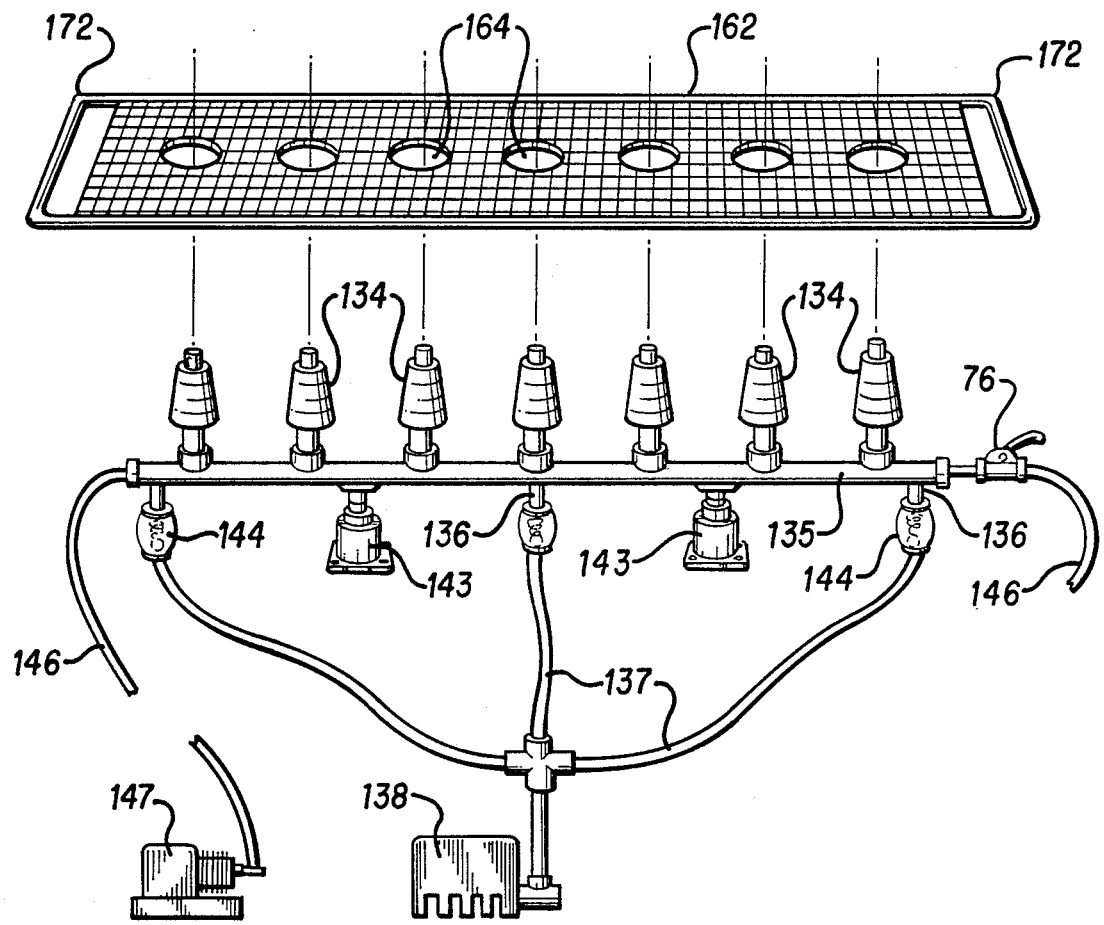
FIG. 4 is an exploded view of the nozzle manifold and tray according to the second embodiment.

In the case of users having a need to process a large number of oil filters in a short period of time, the concept as described above may be altered so as to enable the simultaneous treatment of a plurality of filters 12. FIGS. 3-5 illustrate an embodiment of the present invention whereby gang treatment of the filters is accomplished by utilizing the same sequence of operations as previously described but wherein these operations are carried out at a single treatment station.

As shown most clearly in FIG. 3, the oil filter cleaning system 120 includes a treatment station 122 located adjacent a sorting station 124. The purpose of the sorting station is to permit grouping of incoming used oil filters 12 according to their diameter, a parameter which must be considered when the piercing operation is conducted at the treatment station 122. To facilitate this sorting, a sizing template 126 may be employed upon or adjacent the sorting table 128. The template includes a planar member provided with a plurality of adjacent passageways 130, each of differing widths representative of the various sizes of oil filters to be treated. In use of the sorting station 124, the operator sizes the incoming filters 12 according to their diameter by using the described template 126 and then accumulates the sized filters on the loading table 132 on the other side of the template 126.

When a plurality of filters having the same diameter have been collected on the loading table 132, they may be processed simultaneously in the treatment station 122. In this single station, all filters mounted therein will be pierced and drained and then injected with solvent under pressure followed by blasting with pressurized air so that when thereafter removed from this station, the filters 12 will have been cleansed of all significant amounts of oil. The treatment station 122 will be seen to include a plurality of upstanding nozzles 134 communicating with a common first conduit 135 having one or more lines or second conduits 136 leading to a submersible pump 138 on the bottom wall 140 of the housing 142. Vertically adjustable mounts 143 may be employed to support the first conduit 135 within the housing so as to permit alternative vertical disposition of the nozzles 134 when processing filters of various heights. For purposes of clarity, only four nozzles 134 are shown in FIG. 3 but it will be understood that any reasonable number may be employed, such as the seven nozzles illustrated in FIG. 4. Again, each pump output line 137 includes a one-way check valve 144 before reaching the first conduit. Also, pressurized air is admitted to the first conduit by one or more air lines 146 from a suitable compressor 147 and is regulated, either by a valve in line 146 or a switch controlling the motor of the compressor.

Mounted within the housing 142, adjacent the manifold arrangement of the nozzles 134 and first conduit 135, is the piercing and draining assembly 148 and which comprises a pair of spaced apart cutter bars 150—150, provided with opposed inside faces 152 from which extend a plurality of longitudinally spaced apart cutter elements or piercing points 154. Support elements 156, stationary relative the housing 142, retain the cutter bars 150—150 and allow for their rectilinear movement as produced by suitable fluid motor means such as pneumatic or hydraulic cylinders 158 operable to displace the two cutter bars in opposition to one another, through appropriate control arms 160.

To allow for the mass handling of a plurality of filters following their treatment at this station, a perforated tray 162 is removably disposed between the cutter bars 150 and includes enlarged openings 164 adapted to freely surround each of the upstanding nozzles 134. The manipulation of this tray 162 will be described following a discussion of the piercing, rinsing and cleansing of the filters.

With a plurality of similar diameter filters 12 mounted upon the nozzles 134, the fluid motors 158 are actuated by manipulating a control panel 166 to cause the two cutter bars 150 with their piercing points 154, to be displaced inwardly toward one another and pierce the diametrically opposed openings 53—53 in all of the mounted filters 12. The distance the cutter bars 150 and points 151 are urged toward one another is determined by the size of filters 12 being operated upon. The reason for initially sorting the filters according to their diameter will now be apparent since, it is obvious that the cutter points 154 must be displaced variable distances, depending upon the size of filters being treated. If filters of mixed sizes were being acted upon simultaneously, uneven stresses would be placed upon the cutter bars and fluid motors 158 and the resultant pierced openings 53 would be inconsistent. Accordingly, the amount of displacement of the cutter bars may be controlled either electrically, by selecting an appropriate motor switch on the control panel 166 or physically, by inserting a specifically sized block (not shown) between the cutter bars 150 before actuating same.

Following the piercing operation, it will be understood that the majority or excess amount of oil within the plurality of filters 12 will drain from the can openings 53, passing through the perforated tray 162 into the solvent S as contained within the chamber 168 of the housing 142. As in the embodiment previously described, the lighter oil component will accumulate atop the solvent S. As an alternative, a removable or displaceable drain pan (not shown) may be inserted into the chamber 168, beneath the first conduit 135, to capture and carry away to a suitable waste oil drain, the bulk of oil as released from the filters 12 during the piercing operation. This optional feature would reduce the frequency of shutting down the apparatus for draining and replacement of solvent S but is not absolutely necessary since, several thousand filters 12 may be treated without replacement of the chamber fluid, particularly when a housing chamber 168 is provided with a fluid capacity of say, 50 to 100 gallons.

After the piercing and draining operation, the rinsing and cleansing procedure is accomplished as before, by first actuating the fluid pump 136 as by the control panel 166, to rinse the filter can interior and its filter medium, with the injected solvent S being expelled from the can openings 53 and into the chamber 168. Thereafter, the air compressor is activated either through the control panel 166 or by manipulating the valve 76 to allow compressed air to pass from the lines 146 into the first conduit 135 and thence through the plurality of nozzles 134 and into the filter interiors, with the residue being expelled from the filter openings 53 and into the chamber 168. During this latter operation, the compressed air is precluded from passing from the second conduits or lines 136 to the pump 138, by means of the intermediate check valves 144.

The plurality of thusly cleansed filters 12 may then be removed from the treatment station 122 by a single maneuver wherein the perforated tray 162 is lifted by the end handles 172—172 and flipped over to one side, in order to dump the clean filters 12 into the adjacent hopper 174. A chute 176 joined to the hopper 174 may lead to any suitable collection apparatus (not shown) for accumulating the clean filters. Again, a cover 178 may be hingedly attached, as at 180, and include a window 182 to permit the operator to observe the treatment sequences when the cover is closed. Also, a switch 184 may be provided on the housing 142 for engagement with the cover 178 when closed, so as to close a circuit permitting operation of the control panel 166. As in the first described embodiment, a valved drain line 186 and overflow or discharge line 188 are included to service the solvent S and oil component within the housing 142.

I claim:

1. A cleaning apparatus for oil filters containing waste oil and including a cylindrical can having an end wall provided with an opening comprising;

a housing provided with a chamber containing fluid solvent, piercing means operable to form a plurality of drain openings in said can adjacent said end wall to allow drainage of excess waste oil from said filter, rinsing and cleansing means disposed atop said solvent in said chamber and including a first conduit having an upstanding nozzle adapted to engage said filter within said end wall opening, a fluid pump within said chamber connected to a second conduit in turn connected to said first conduit, a compressed air supply line communicating with said nozzle, control means operable to actuate said fluid pump to deliver said solvent through said nozzle and into a filter can mounted upon said nozzle to flush residual waste oil from said filter can through the drainage openings as produced by said piercing means, and control means operable to direct air from said compressed air supply line through said nozzle into a filter can mounted upon said nozzle to remove residual solvent and traces of waste oil from said filter can through the drainage openings as produced by said piercing means.

2. A cleaning apparatus for oil filters containing waste oil according to claim 1 including, a one-way check valve in said second conduit precluding passage of compressed air to said fluid pump.

3. A cleaning apparatus for oil filters containing waste oil according to claim 1 wherein, said nozzle comprises an upwardly and inwardly tapered member.

4. A cleaning apparatus for oil filters containing waste oil according to claim 1 wherein, said piercing means includes a pair of opposed cutter points and, shiftable means operable to displace one said cutter point relative the other said cutter point.

5. A cleaning apparatus for oil filters containing waste oil according to claim 4 wherein, one said cutter point is fixedly mounted relative said housing, means mounting the other said cutting point for rectilinear displacement relative said fixedly mounted cutter point, and said shiftable means including a lever pivotally attached to said mounting means.

6. A cleaning apparatus for oil filters containing waste oil according to claim 1 wherein, said housing chamber is defined by a plurality of lateral walls and a bottom wall, a drain line in one said lateral wall adjacent said bottom wall, and an overflow line in one said lateral wall in a plane below said nozzle.

7. A cleaning apparatus for oil filters containing waste oil according to claim 1 including, a cover pivotally attached to said housing and displaceable to and from a position overlying said chamber.

8. A cleaning apparatus for oil filters containing waste oil according to claim 7 including, switch means operable when said cover is in said position overlying said chamber to permit actuation of said fluid pump control means.

9. A cleaning apparatus for oil filters containing waste oil according to claim 7 including,
a window within said cover.

10. A cleaning apparatus for oil filters containing waste oil according to claim 1 including,
a plurality of said nozzles upstanding from said first conduit.

11. A cleaning apparatus for oil filters containing waste oil according to claim 10 including,
a perforated tray having a plurality of enlarged openings, and
said tray removably disposed atop said first conduit with said nozzles surrounded by said tray openings.

12. A cleaning apparatus for oil filters containing waste oil according to claim 1 including,
sorting means adjacent said chamber allowing ready identification of the diameter of said filter cans.

13. A cleaning apparatus for oil filters containing waste oil according to claim 12 wherein,
said sorting means includes a template having a plurality of passageways of varying widths.

14. A cleaning apparatus for oil filters containing waste oil according to claim 1 wherein,
said piercing means comprises a pair of cutter bars each provided with a plurality of cutter points with said points on one said bar opposed to said points on the other one of said bars.

15. A cleaning apparatus for oil filters containing waste oil according to claim 14 including,
fluid motor means operable to horizontally displace said cutter bars relative one another.

16. A cleaning apparatus for oil filters containing waste oil according to claim 14 including,
hopper means adjacent said chamber for collection of rinsed and cleansed filter cans.

* * * * *